C. HOSKING AND L. L. HAHN.
AUTOMOBILE LOCK.
APPLICATION FILED JUNE 10, 1920.
1,382,729.
Patented June 28, 1921.
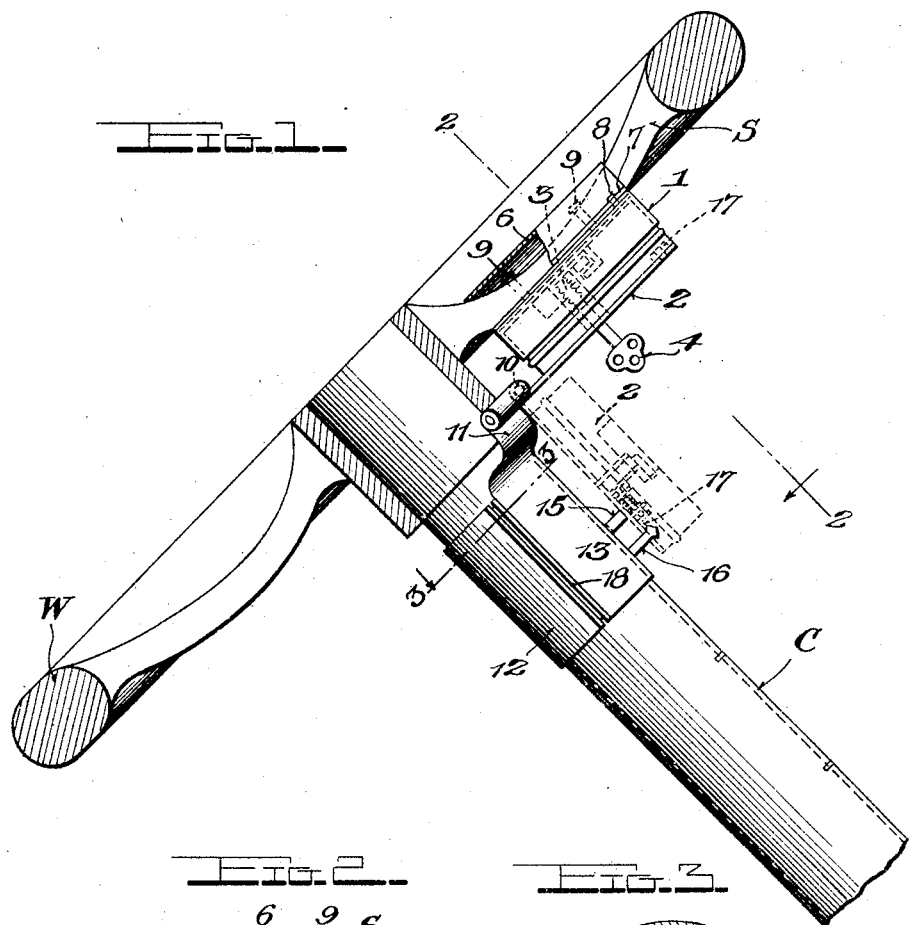
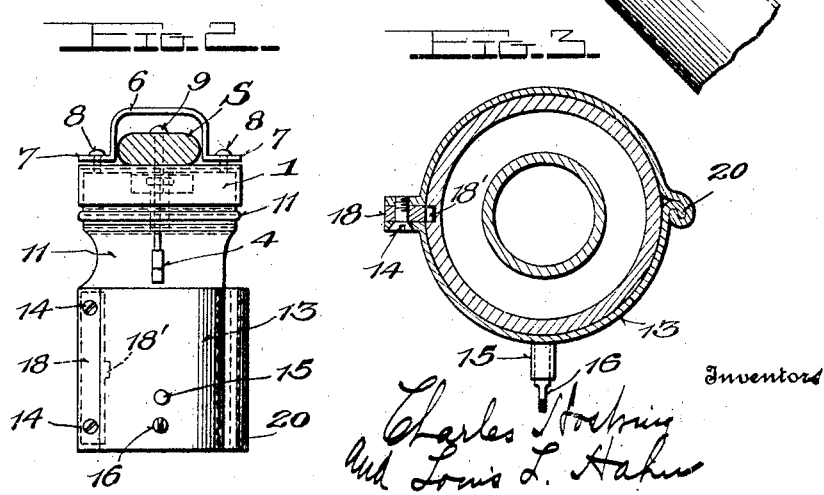

UNITED STATES PATENT OFFICE.

CHARLES HOSKING AND LOUIS L. HAHN, OF PHILADELPHIA, PENNSYLVANIA.

AUTOMOBILE-LOCK.

1,382,729. Specification of Letters Patent. Patented June 28, 1921.

Application filed June 10, 1920. Serial No. 387,971.

*To all whom it may concern:*

Be it known that we, CHARLES HOSKING and LOUIS L. HAHN, citizens of the United States, residing at Philadelphia, in the county of Philadelphia and State of Pennsylvania, have invented certain new and useful Improvements in Automobile-Locks, of which the following is a specification.

This invention relates to certain new and useful improvements in automobile locks, and pertains more especially to a lock which is applied to the steering wheel.

The primary object of the invention is to provide a lock which can be applied to the steering wheel and column or post without injury to or alteration of these parts in any manner whatever.

A further object of the invention is to provide a lock of this type which is of simple and economical construction, which can be easily and quickly applied to the steering wheel and post, and which is effective in the performance of its functions.

Further and other objects will be later set forth and manifested in the course of the following description.

In the drawings:

Figure 1, is a fragmentary view, partly in section of the steering wheel and the post or column thereof, showing the present invention applied thereto, Fig. 2, is a section on line 2—2 of Fig. 1, and Fig. 3, is a section on line 3—3 of Fig. 1.

In proceeding in accordance with the present invention, a lock member is employed which consists of an upper section 1 and a lower section 2, the section 2 being received within the section 1 as shown in Fig. 1 and held by any suitable form of lock 3 operated by a key 4. The section 1 constitutes a socket member to receive the section or head 2 and is secured to the under side of the spoke S of the steering wheel W, by a cap 6 which engages over the top of the spoke S and has sides engaging the sides of the spoke, the sides being turned outwardly to form retaining flanges 7 which are riveted at 8 to the section 1 of the lock. In addition, rivets or other suitable fastenings 9 pass through the spoke S and are secured to the section 1 to further attach the latter to the steering wheel. Since the cap 6 at its ends snugly engages the spoke S, and further since the cap overlies and conceals the fastenings 9, it will be apparent that removal of the section 1 cannot be effected except with the expenditure of considerable time and labor.

The section 2 is hinged at 10 to an arm 11 which projects upwardly from a clamp composed of two parts 12 and 13 suitably secured by a slidable seam or slip-joint and by fastenings 14, the clamp being secured about the column C as shown in Fig. 1. The section 2 of the lock is provided with a rubber buffer 15, so that when the section 2 occupies the position shown in dotted line in Fig. 1, same will be held out of contact with the clamp, and rattling of the parts thereby prevented. For the purpose of latching the section 2 in the dotted line position of Fig. 1, a headed pin 16 is mounted on the clamp and is formed to engage any suitable form of catch or latch 17 carried by the section 2.

In operation the section 2 is swung from the dotted line position of Fig. 1 to the full line position of the latter, and the key 4 then manipulated to lock the lock. It will thus be apparent that the wheel is locked to the column C against all turning movement. When the car is to be operated the key is manipulated to open the lock, whereupon the section 2 is swung downwardly to the dotted line position of Fig. 1 and held by the latching mechanism 16—17.

Preferably a plate 18 is used having a rigid lug 18, the latter extending into a hole which may be cut or bored in the steering column C, the plate being arranged between the sections 12 and 13 of the clamp and secured by the fastenings 14, so as to guard against any possible rotation of the clamp on the steering column.

What is claimed is:

1. In a lock for steering wheels, a member secured to a spoke of the wheel and having a socket on its under side extending downwardly in a plane at approximately right angles to the plane of the wheel, a head member receivable in the socket and disposed to lie therein in a plane parallel to the plane of the wheel, a lock borne by the head member and also receivable in the socket, and means to mount the inner end of the head member on the steering column.

2. In a lock for steering wheels, a box-like member arranged on the underside of a spoke of the wheel and having its underside open, means for securing the member to the spoke, a cap straddling the spoke and attached to the member for inclosing the securing means, and a lock member adapted to be mounted on the steering column for movement into and out of the box-like member.

3. In a lock for steering wheels, a downwardly opening box-like member secured to the underside of the wheel and formed interiorly to serve as a lock keeper, a support adapted to be mounted on the steering column, a lock, and a lock-carrying member movably mounted on the support for movement with the lock into and out of the box-like member whereby said lock may be engaged with the keeper.

4. In an automobile lock, a member formed for rigid attachment to the steering column, a sectional lock, fastening means extending through one of the steering wheel spokes and connected to one of the lock sections, a cap engaged at its ends with the spoke and with opposite sides thereof and rigidly secured to said lock section in overlying relation to said fastening means to completely house and conceal the latter, and means to hingedly connect the other lock section to said member.

5. In an automobile lock, a member formed for rigid attachment to the steering column, a sectional lock one of the sections of which is engaged at its top with the underface of one of the steering wheel spokes, means to rigidly secure said section to the spoke, a cap overlying said means and the spoke and engaged with opposite sides of the spoke and with the upper face thereof at the ends of the cap, and means to hingedly connect the other lock section to the member.

In testimony whereof we affix our signatures.

CHARLES HOSKING.
LOUIS L. HAHN.